United States Patent [19]
Slobodkin

[11] Patent Number: 5,674,319
[45] Date of Patent: Oct. 7, 1997

[54] DIE COATER AND METHOD FOR APPLYING MATERIAL TO WEBS OF DIFFERENT WIDTHS

[75] Inventor: Yefim Slobodkin, Lyndhurst, Ohio

[73] Assignee: Avery Dennison Corporation, Pasadena, Calif.

[21] Appl. No.: 393,859

[22] Filed: Feb. 24, 1995

[51] Int. Cl.⁶ .................................................. B05C 3/12
[52] U.S. Cl. .................... 118/411; 427/256; 427/356; 118/410; 118/413; 118/419
[58] Field of Search .................................. 118/410, 411, 118/413, 419; 427/256, 356

[56] References Cited

U.S. PATENT DOCUMENTS 3,849,945  11/1974  Lindzy .................................. 51/229
4,883,691  11/1989  McIntyre .............................. 427/256

OTHER PUBLICATIONS

Lip Coater Brochure from Hirano Tecseed Co., Ltd. (5 pages) (no date).

*Primary Examiner*—Katherine A. Bareford
*Attorney, Agent, or Firm*—Renner, Otto, Boisselle & Sklar, P.L.L.

[57] ABSTRACT

A die coater for applying a material to a web is provided including a die for applying the material to the web in an application region; and a plurality of interconnected rolls selectably positionable in the application region to serve as a backup roll for the web for the application of the material, In addition, or in the alternative, the die coater includes a plurality of interconnected dies selectably positionable in the application region for applying the material to the web; and a backup roll for the web in the application region, wherein a selected one of said interconnected dies selectably positioned in said application region is adjustable to adjust an angle at which said material is applied to said web through said selected die.

29 Claims, 3 Drawing Sheets

# DIE COATER AND METHOD FOR APPLYING MATERIAL TO WEBS OF DIFFERENT WIDTHS

TECHNICAL FIELD

The present invention relates generally to a die coater apparatus for dispersing a material, such as an adhesive, onto a sheet-like web. More particularly, the present invention relates to a universal or adjustable die coater apparatus which is capable of changing between different rolls and/or dies for dispersing different materials on webs having different widths.

BACKGROUND OF THE INVENTION

Die coaters for dispersing or otherwise forming a layer of material on a sheet or web are known in the art. For example, die coaters are used often in the production of pressure sensitive materials such as labels. In such case, a die coater is used to apply an adhesive layer on a web of liner material in the construction of the pressure sensitive material. The adhesive can be a liquid adhesive, an emulsion based adhesive, solvent based adhesive, or a solid hot melt adhesive, for example.

In a conventional type of die coater, a web material is run along a backup roll as a die applies a material such as an adhesive on the surface of the web. The die is located adjacent the backup roll and includes a slot through which the material to be applied is extruded. As the material exits the slot, the material is applied to the web which is supported by the backup roll. Typically, die coaters are designed to operate at high speeds on the order of 1000 to 1500 feet of web per minute or even higher.

The width of the web and the type of material which is to be applied to the web can vary from job to job. Typically, the backup roll preferably has a width which is approximately equal to the width of the web. As a result, different width webs require different width backup rolls. Moreover, oftentimes different materials which are to be applied through the die are non-compatible. It is therefore necessary to clean the die thoroughly prior to introducing a different, non-compatible, material into the die.

The task of replacing the backup roll with a backup roll having a different width has required significant down time in the past. The running of the web must be stopped and the labor intensive task of replacing the backup roll must be carried out prior to restarting the web run or beginning a new web run. This typically involves physically removing the original backup roll and replacing it with another backup roll. The web must then be rerouted through the die coater prior to restarting the coating process. This procedure for changing the backup roll can take an hour or more and results in a severe reduction in production efficiency.

Similarly, if it becomes necessary to switch from applying one material through the die to another material which is non-compatible with the original material, it has been necessary in the past to shut down the die coater in order to clean out the die. Again production efficiency suffered as a result. An option in the past has been to remove the original die and to replace it with a clean die for applying the non-compatible material. Unfortunately, this also required that the die coater be shut down for a substantial amount of time. Furthermore, in a die coater the alignment between the backup roll and the die is important to the operation of the apparatus. Thus, the replacement die must be carefully aligned to ensure proper alignment with respect to the backup roll. This results in additional down time to perform the adjustments necessary to ensure such alignment.

The amount of down time associated with changeovers between backup rolls and/or dies in conventional die coaters has become an even more serious problem in view of an increase in the industry in short orders, i.e., short runs of web. This has resulted in a need for more frequent changeovers between roll widths and/or dies.

Often an oven is used to cure the web and adhesive thereon. Nonuniform heating and possibly damage to the web and/or coating can occur if the time in the oven changes, e.g., due to down time while a roll or die is being changed or adjusted. Overcuring during down time can cause the web to become brittle resulting in web breaks and reduced production.

Efforts to eliminate the down time associated with changing rolls and/or dies have included the development of modular based die coater systems. In conventional modular systems, the backup roll remains in a main frame while the die for applying the material is housed in a removable module. Different modules including different dies can be exchanged with one another in the main frame. A drawback with such modular systems is that there still is substantial downtime associated with removing one module from the main frame and inserting another. Furthermore, the modules can weigh on the order of three thousand pounds to five thousand pounds and are difficult to maneuver even in the event the modules are mounted on casters. Also, the repeated removal and insertion of the modules can result in the die becoming misaligned relative to the backup roll.

Other known modular systems have attempted to overcome the misalignment problem by including the backup roll and the die together in a removable module. Again, however, changing the backup roll and die module requires substantial down time. Moreover, it is necessary to cut the web first in order to remove the module, and to splice or refeed either the previous web or a new web through the die coater after the new module has been inserted. It is not possible to avoid having to cut the web when changing modules and simply splice a new web material as is often desired. This system also has the same problems as above in relation to nonuniform heating due to down time.

In view of the aforementioned shortcomings associated with conventional die coaters, it will be appreciated that there is a strong need in the art for a die coater which does not involve substantial down time when changing over between backup rolls and/or dies. In particular, there is a strong need in the art for a universal die coater which changes between different backup rolls and/or different dies rapidly and automatically while preserving the precision alignment therebetween. Moreover, there is a strong need for a die coater which does not require that the web be cut and rerouted through the die coater during a changeover of the dies or rolls or require that the web run be stopped during a changeover.

SUMMARY OF THE INVENTION

The die coater according to the present invention overcomes the above-mentioned drawbacks associated with conventional die coaters. The present invention provides a die coater which changes between different backup rolls and/or different dies quickly and automatically. The die coater avoids the substantial down time which is associated with conventional die coaters. The respective backup rolls can be switched without stopping the web run; and the respective dies also can be switched without stopping the web run. In addition, the precision alignment between the rolls and the dies is maintained regardless of the number of changeovers. With the present invention, it is not necessary to cut the web when changing the backup rolls or dies. Different webs can simply be spliced together before reaching the coater without stopping the web.

According to one particular aspect of the present invention, a universal die coater for applying a material to a web is provided including a die for applying the material to the web in an application region, and a plurality of interconnected rolls selectably positionable in the application region to serve as a backup roll for the web for the application of the material.

According to another aspect of the present invention, a universal die coater for applying a material to a web is provided, including a plurality of interconnected dies selectably positionable in an application region for applying a material to the web, a backup roll for the web in the application region, and wherein a selected one of the interconnected dies selectably positioned in the application region is adjustable to adjust an angle at which the material is applied to the web through the selected die.

According to still another aspect of the present invention, a universal die coater for applying a material to a web is provided, including a plurality of interconnected dies selectably positionable in an application region for applying a material to the web, a backup roll for the web in the application region, and wherein the interconnected dies are connected to a hub member rotatable about an axis to position a selected die in the application region, each of the dies being materially offset from the axis.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings wherein like reference labels are used to refer to like elements throughout.

Figure 1:
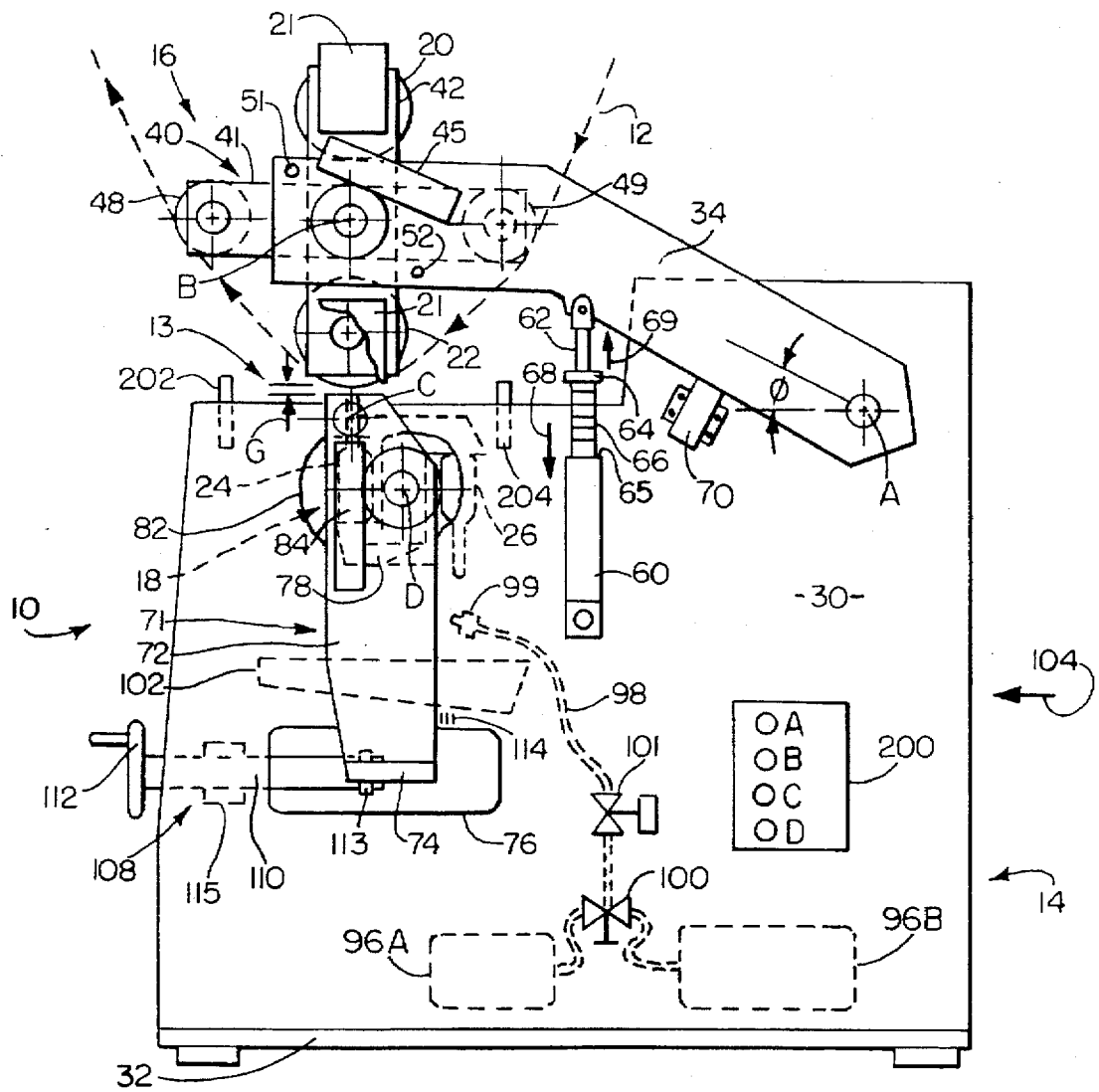
FIG. 1 is a side view in partial phantom of a die coater apparatus in accordance with the present invention.
Figure 2:
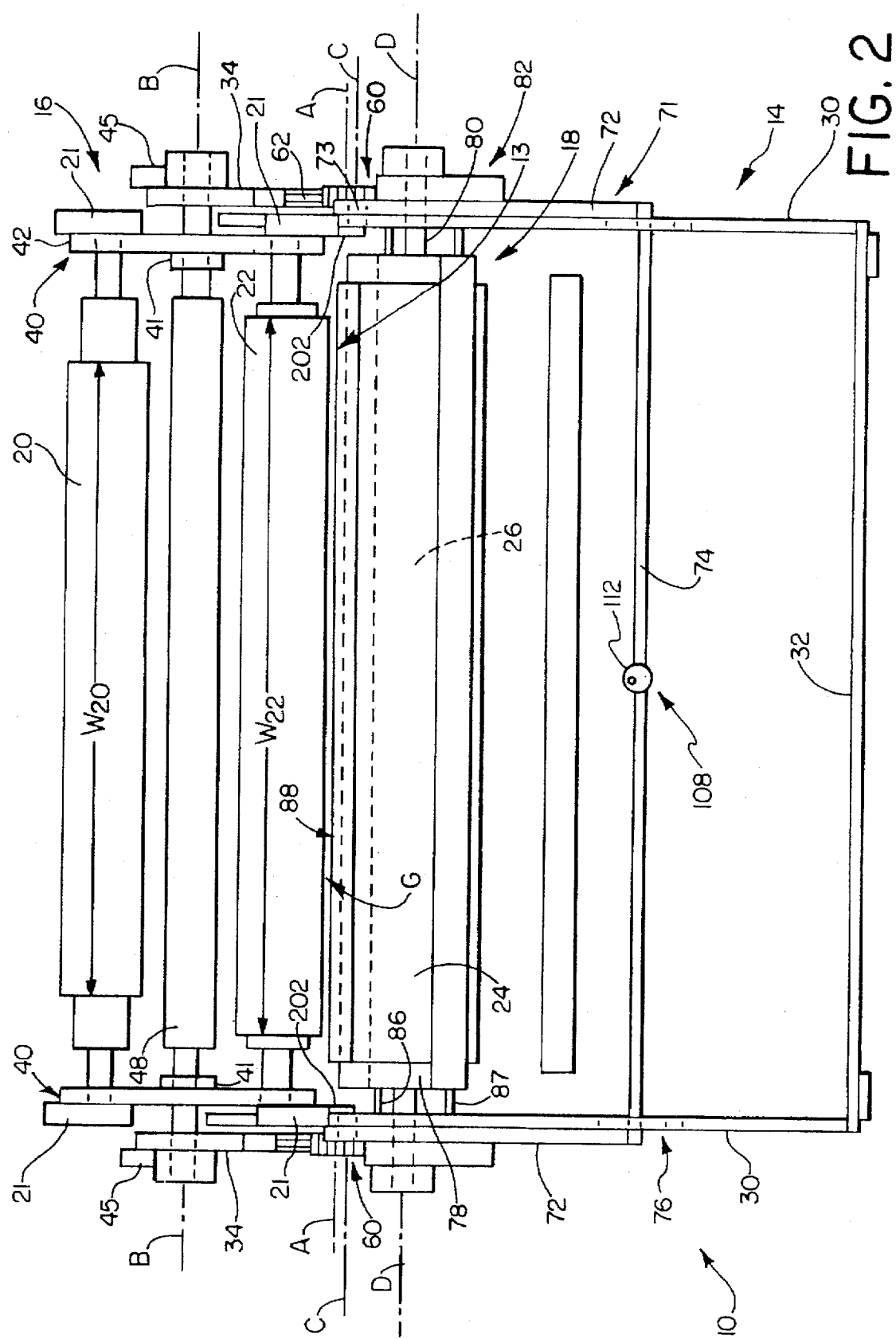
FIG. 2 is a front view in partial phantom of the die coater apparatus in accordance with the present invention.

Referring initially to FIGS. 1 and 2, a die coater apparatus 10 is shown in accordance with a preferred embodiment of the invention. As will be appreciated based on the following description, the die coater 10 applies a layer of material such as an adhesive to the surface of a web 12. The web 12 is provided to the die coater 10 from a roll stock or the like (not shown), and is threaded or otherwise routed through the die coater 10 in the direction shown in FIG. 1. During a web run, the web 12 runs through the die coater 10 where the adhesive or other material is applied to the web in an application region 13 prior to the web exiting the die coater. Upon exiting the die coater 10, the web 12 is typically run through a curing station such as an oven (not shown) downstream of the die coater 10. The oven cures the adhesive or other material applied to the web 12 prior to the web 12 being taken up on a take-up roll.

In general, the die coater 10 includes a main frame assembly 14, a roll turret 16, and a die turret 18. As will be described in more detail below, the roll turret 16 includes two backup rolls 20 and 22. The die turret 18 includes two dies 24 and 26. Both the roll turret 16 and the die turret 18 are rotatably secured to the frame assembly 14 and can be rotated at least 180° such that either backup roll and either die can be positioned in the application region 13. A particular backup roll can be selected simply by rotating the roll turret 16. Similarly, a particular die can be selected simply by rotating the die turret 18. The backup rolls 20 and 22 may have different widths $W_{20}$ and $W_{22}$ as shown in FIG. 2, for example, for accommodating different width webs. The different dies 24 and 26 allow for one die to be used to apply a material while the other die is available for cleaning, for example, as will be explained more fully below.

It will be appreciated based on the following detailed description that the roll turret 16 and die turret 18 rotate independently on opposite sides of the web 12. As a result, it is not necessary to cut or to stop the web 12 during a web run when changing between backup rolls and/or dies. The construction of the die coater 10 is such that the precision alignment between the selected roll and die in the application region 13 is maintained following the rotation of either the roll turret 16 or the die turret 18. Furthermore, the die coater 10 is designed such that a gap between the selected backup roll and die in the application region 13 can be opened and closed quickly to allow the passage of a seam in the web 12, for example. These and many other features of the present invention will now be described in detail.

Briefly describing the frame assembly 14, the frame assembly 14 is symmetric and includes side members 30 attached to a base member 32. Roll turret pivot arms 34 are pivotally attached at their respective ends to a corresponding side member 30 about pivot axis A. The roll turret 16 is rotatably fastened between the other ends of the pivot arms 34. More specifically, the roll turret 16 includes a pair of hubs 40. Each hub 40 includes rectangular-shaped hub members 41 and 42 fixedly connected to each other in crossed relationship as is shown in FIG. 1. The center of each hub 40 is connected to a corresponding pivot arm 34 so as to rotate about a rotational axis B. A hydraulic actuator 45 or other means for controllably rotating the respective hubs 40 about axis B is mounted to each pivot arm 34.

Referring now to FIG. 2, the backup roll 20 is supported in journalled relationship via adjustable bearing housings 21 at each end by a corresponding end of the respective hub members 42 in the hubs 40. Similarly, the backup roll 22 is supported in journalled relationship via adjustable bearing housings 21 at each end by the other ends of the respective hub members 42. Each of rolls 20 and 22 can be inserted or removed from the hubs 40 together with its respective bearings housing 21 at each end. More particularly, the hubs 40 each include a machined guide to receive a key (not shown) on the respective bearing housing 21 to provide relatively accurate positioning of the bearing housings 21 in the hubs 40. Bolts or the like (not shown) are used to secure the respective housings 21 in position between the hubs 40.

The roll turret 16 also includes a pair of idler rolls 48 and 49. Idler roll 48 is supported in journalled relationship at each end by a corresponding end of the respective hub members 41. Similarly, idler roll 49 is supported in journalled relationship at each end by a corresponding other end of the hub members 41.

The rotational axes of each of the respective rolls 20, 22, 48 and 49 preferably are located in the respective hubs 40 such that the distance between the rotational axis B of the roll turret 16 and outer radial edge of each roll preferably is the same. As a result, when the roll turret 16 is rotated around axis B the length of the path followed by the web 12 around the roll turret 16 will remain substantially the same. Thus, when the roll turret 16 is rotated during a web run, there will be no sudden slack or stretching introduced to the web due to a change in the length of the path followed by the web 12.

The positioning of the backup rolls in relation to the application region 13 is controlled as the roll turret 16 rotates to adjustable mechanical stops included in the pivot arms 34. In the preferred embodiment, each pivot arm 34 includes a pair of precision mechanical stops 51 and 52 (represented schematically) for limiting the amount of rotation of the roll turret 16 in respective directions. When the hydraulic actuators 45 are activated, the roll turret 16 is driven clockwise about the axis B until a selected portion of hub 40 is driven against stop 51 on each pivot arm 34. In this state, the backup roll 22 is positioned in the application region 13 adjacent either die 24 or die 26, depending upon which die has been selected. As the hydraulic pressure in the actuators 45 is maintained during activation, the roll turret 16 fixedly remains in position against the stop 51 such that the precise position of the backup roll 22 is reliably known.

When the hydraulic actuators 45 are activated in the opposite direction (i.e., deactivated), the roll turret 16 is driven about the axis B in the opposite direction until a selected portion of the hub 40 is driven up against mechanical stop 52 on each pivot arm 34. In this state, the backup roll 20 will be located in the application region 13 adjacent either die 24 or die 26. As the hydraulic pressure remains during activation in the opposite direction, the roll turret 16 remains in fixed position against the stop 52 such that the precise position of the backup roll 20 is reliably known.

Referring back to FIG. 1, the die coater 10 includes a hydraulic actuator 60 connected to each pivot arm 34 for controlling the movement of the pivot arms. By rotating the pivot arms 34 about the A axis so as to increase or to decrease the angle $\phi$, the die coater 10 is able to control the distance of the gap G (FIG. 2) between the selected backup roll and the die in the application region 13. More specifically, each actuator 60 is fixedly mounted at one end to a corresponding side member 30 and includes a rod 62 which extends from the other end. The rod 62 is oriented substantially vertically and is designed to move axially through the actuator in response to hydraulic pressure provided thereto. The distal end of each rod 62 is pivotally connected to the corresponding pivot arm 34 approximately half way between the pivot axis A and where the roll turret 16 is attached to the pivot arm 34. Attached to the rod 62 is a collar 64, and located on the rod between the collar 64 and a fixed surface 65 of the actuator are spring washers 66.

During a web run, hydraulic pressure is provided to the actuators 60. The hydraulic pressure causes the rod 62 in each actuator 60 to retract in the direction denoted by arrow 68. This causes the roll turret 16, and the selected backup roll in particular, to be rotated about axis A towards the selected die in the die turret 18, thereby decreasing the gap G to provide an appropriate gap between the selected backup roll and the selected die in the application region 13. The spring washers 66 are compressible so as to compress between the collar 64 and surface 65 to allow the actuator 60 to pull the pivot arms 34, and thus the roll turret 16, downward. As described more fully in connection with FIG. 4 below, the bearing housing 21 on each side of the selected backup roll is adjustable and cooperates with the frame so as to limit the downward rotation of the pivot arm such that a preselected distance for the gap G is present between the selected backup roll and die. As hydraulic pressure is continued to be applied to the actuators 60, the pivot arms 34 continue to be held securely against the stops provided by the frame in cooperation with the bearing housings 21 such that the preselected gap G is maintained between the backup roll and the die in the application region 13. It will be appreciated that the dimension of the gap G as shown in the drawings is exaggerated and is typically very small.

When hydraulic pressure is removed from the actuators 60, the spring washers 66 expand so as to urge the respective pivot arms 34 upward and pivot about axis A in a clockwise direction relative to FIG. 1. The roll turret 16 is lifted upward, as a result, causing the gap G between the selected backup roll and die to increase until an equilibrium point is reached based on the weight of the roll turret 16 and the pivot arms 34, as will be appreciated. In the preferred embodiment, the spring washers are selected such that the gap G will be approximately one-half inch in the open condition.

Thus, during a web run hydraulic pressure is provided to the actuators 60 to cause the gap G between the selected backup roll and die to remain closed. During such time, adhesive or some other material is extruded through a slot in the selected die and is applied to the web. In the event it is desirable to open the gap G during the run, e.g., so as to provide spacing for passage of a splice in the web 12, the gap G can be opened rapidly by removing the hydraulic pressure and then closed rapidly by reapplying the hydraulic pressure. In the event of a hydraulic failure, the gap G will remain in the open condition so as to avoid damage to the roll which may otherwise contact the die.

In the event it is necessary to raise the roll turret 16 substantially, e.g., in order to remove or replace a backup roll, hydraulic pressure is applied to the actuators 60 in a reverse direction so as to cause the rod 62 to extend in the direction shown by arrow 69 in FIG. 1. As a result, the pivot arms 34 will rotate clockwise around axis A with respect to FIG. 1 to cause the roll turret 16 to raise upward. At the same time, safety stops 70 mounted on the side members 30 are provided in the event of a hydraulic failure. Normally retracted within the side members 30, the safety stops 70 are designed to automatically extend outward (e.g., in a direction out of the page as shown in FIG. 1) into the path of any downward rotation of the pivot arms 34 to prevent the roll turret 16 from rapidly descending onto the frame 30 in the event of a hydraulic failure and possibly contacting the selected die and/or injuring a worker.

Next, the die turret 18 will be described in more detail. Referring to FIG. 2, the die coater 10 includes a die turret pivot frame 71 to which the die turret 18 is mounted. More specifically, the pivot frame 71 is a U-shape frame including side members 72 attached at one end to corresponding ends of a cross member 74 extending through openings 76 in the main frame side members 30. As is discussed in more detail in connection with FIG. 4 below, the opposite ends of the side members 72 are each pivotally attached to side members 30 by way of pivot pins 73 such that the frame 71 can pivot about an axis C. A die turret hub assembly 78 includes respective ends supported in journalled relationship to each of the side members 72 via a shaft 80 and through an opening 82 in the main frame side members 30 so as to be rotatable about an axis D.

Figure 3:
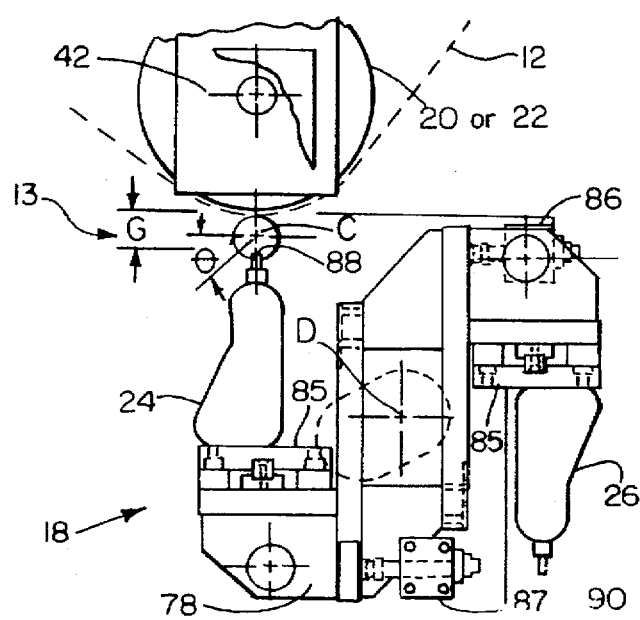
FIG. 3 is a section side view of a die turret included in the die coater apparatus in accordance with the present invention.

A hydraulic actuator 84 is mounted on each side member 72 so as to be capable of rotating the hub assembly 78 in either direction about axis D. FIG. 3 illustrates how the hub assembly 78 includes symmetrical base plates 85 located 180° apart with respect to the axis D. The die 24 is fixedly mounted to a first base plate 85, and the die 26 is fixedly mounted to the second base plate 85 as shown. The side members 72 include mechanical stops 86 and 87 as shown schematically in FIGS. 2 and 3. The mechanical stops are positioned such that when the actuator 84 is activated in a first direction, the hub assembly 78 is rotated clockwise until the hub assembly 78 abuts up against stop 86. In such case, the hub assembly 78 will be in the position shown in FIG.

3 whereby the slot or face 88 of the die 24 is positioned immediately adjacent the selected backup roll 20 or 22 in the application region 13. The slot 88 of die 24 is separated from the selected backup roll by the gap G as described above, with the distance of the gap G being a function of whether the gap G is opened or closed via the pivot arms 34. As hydraulic pressure continues to be applied to the actuator 84, the slot 88 and hub assembly 78 remain securely in place and the position of the slot is reliably known.

When the actuator 84 is activated in the opposite direction the actuator will rotate the hub assembly 78 around axis D in a counter-clockwise direction. The hub assembly 78 will rotate until it engages stop 87. Thus, the hub assembly 78 will be rotated 180° around axis D relative to the position shown in FIG. 3. In such case, slot 90 of die 26 is oriented in essentially the same position as slot 88 in FIG. 3 whereby slot 90 is positioned immediately adjacent the selected backup roll 20 or 22 in the application region 13. Slot 90 of die 26 is separated from the selected backup roll by the gap G as described above, with the distance of the gap G again being a function of whether the gap G is opened or closed via the pivot arms 34. As hydraulic pressure continues to be applied to the actuator 84 in the opposite direction, the slot 90 and the hub assembly 78 remain securely and precisely in place and the position of the slot is reliably known.

It will be appreciated that in the preferred embodiment, axes A through D are all parallel with one another. Furthermore, the rotational axis of each of the backup rolls 20 and 22 and the idler rolls 48 and 49 are parallel with the axes A through D. In addition, the rotational axes of the backup and idler rolls are each parallel with the slots 88 and 90 such that the material will be applied from the selected slot in a direction perpendicular to the travel direction of the web 12.

Referring briefly to FIG. 1, during operation a preselected pressurized adhesive or other material from either a reservoir 96A or 96B can be supplied via a hose 98 to either die 24 or die 26, depending on which die is selectably positioned in the application region 13 to apply the material. When, for example, die 24 is being used to apply an adhesive to the web 12, the hose 98 is connected to die 24 via a quick connect/disconnect connector 99 in order to supply the adhesive from reservoir 96A or 96B. In the event the operator wants to change over to die 26, the hose 98 is disconnected and the hydraulic actuator 84 activated to position die 26 in the application region 13. The operator then connects hose 98 to die 26 via connector 99 so that die 26 is used to apply material to the web 12. A controllable A/B valve 100 having respective inputs connected to receive the adhesives from reservoirs 96A and 96B provides adhesive from the selected reservoir to the other end of hose 98 via a shut-off valve 101.

An advantage of the present invention is that while die 26 is being used to apply material to the web 12, the die 24 can be cleaned and vice versa. More particularly, as die 24 is applying material to the web the operator can connect a hose supplying a pressurized cleaning fluid such as water to the die 26. The cleaning fluid is flowed through the die 24 such that it cleans the die as it exits out the slot 90 prior to falling into a drain pan 102 (FIG. 1 ). In this manner, the die coater 10 does not need to be shut down in order to clean the dies, thereby increasing production efficiency. One die can be cleaned while the other die is used to apply a material to the web. This is particularly significant during changeovers which require the use of a non-compatible material. In the case of a non-compatible material, a different die in the die turret 18 can be selected as opposed to shutting down the die coater, cleaning the die containing the non-compatible material, and then using the same die to apply the new material. In the preferred embodiment, the dies 24 and 26 are laterally offset from the rotational axis D as shown in FIG. 3. As a result of this, an operator can easily reach the die not being used, e.g., die 26 as shown in FIG. 1, from the rear of the apparatus 10 in the direction of arrow 104.

An important adjustment criteria for the die coater 10 is the angle of attack of the die onto the web. More specifically, it is important to be able to control the angle at which the material is dispersed onto the web 12 from the selected die during a run. FIG. 3 shows the slot 88 of die 24 oriented approximately perpendicular relative to the web 12 (i.e., θ= 90°). It is desirable to be able to adjust the angle of attack θ in either direction such that the material from the die can be applied within a wide range of angles. Such capability is provided in the die coater 10 by way of the die turret pivot frame 71 as will now be described.

Referring again to FIG. 1, the die turret pivot frame 71 is able to pivot about axis C as is mentioned above. The precise position of the pivot frame 71 relative to the axis C is controlled by a pivot adjustment mechanism 108. More particularly, the pivot adjustment mechanism 108 includes a threaded shaft 110 with a turn wheel 112 attached to one end of the shaft and the other end of the shaft 110 is in threaded engagement with a nut 113 secured to the cross member 74. The shaft 110 is supported by the main frame 14 in journalled relationship through a bore 115. When the turn wheel 112 is rotated clockwise, the shaft 110 likewise rotates causing the nut 113 together with cross member 74 to move axially to the right as viewed in FIG. 1 and the pivot frame 71 is rotated counterclockwise about axis C. Similarly, when the turn wheel 112 is rotated in a counterclockwise direction, the shaft 110 likewise rotates causing the nut 113 and cross member 74 to move axially to the left and the pivot frame 71 is rotated counterclockwise about axis C.

The slot of the selected die is located approximately at the axis C of the pivot frame as is shown in FIG. 3. As a result, the angle of attack of the die is adjusted substantially in accordance with the pivoting action of the pivot frame 71. Therefore, the operator can set the selected die slot to the desired angle by adjusting the turn wheel 112. The turn wheel 112 is then locked into position using conventional means so as to precisely maintain the selected angle of attack. An inclinometer 114 (shown as gradations on the frame 30 in FIG. 1) indicates the position of the pivot frame 71 and provides an indication of the precise setting of the angle of attack. In another embodiment, a digital inclinometer may be used for detecting the position of the pivot frame 71 in order to provide a digital readout of the angle of attack.

The bearings supporting the roll turret 16, the die turret 18, the respective rolls, and the pivot arms 34 about their respective rotational axes are preferably precision bearings with little or no backlash. This ensures that both the roll turret and die turret components remain in precise alignment in each of their respective positions.

Figure 4:
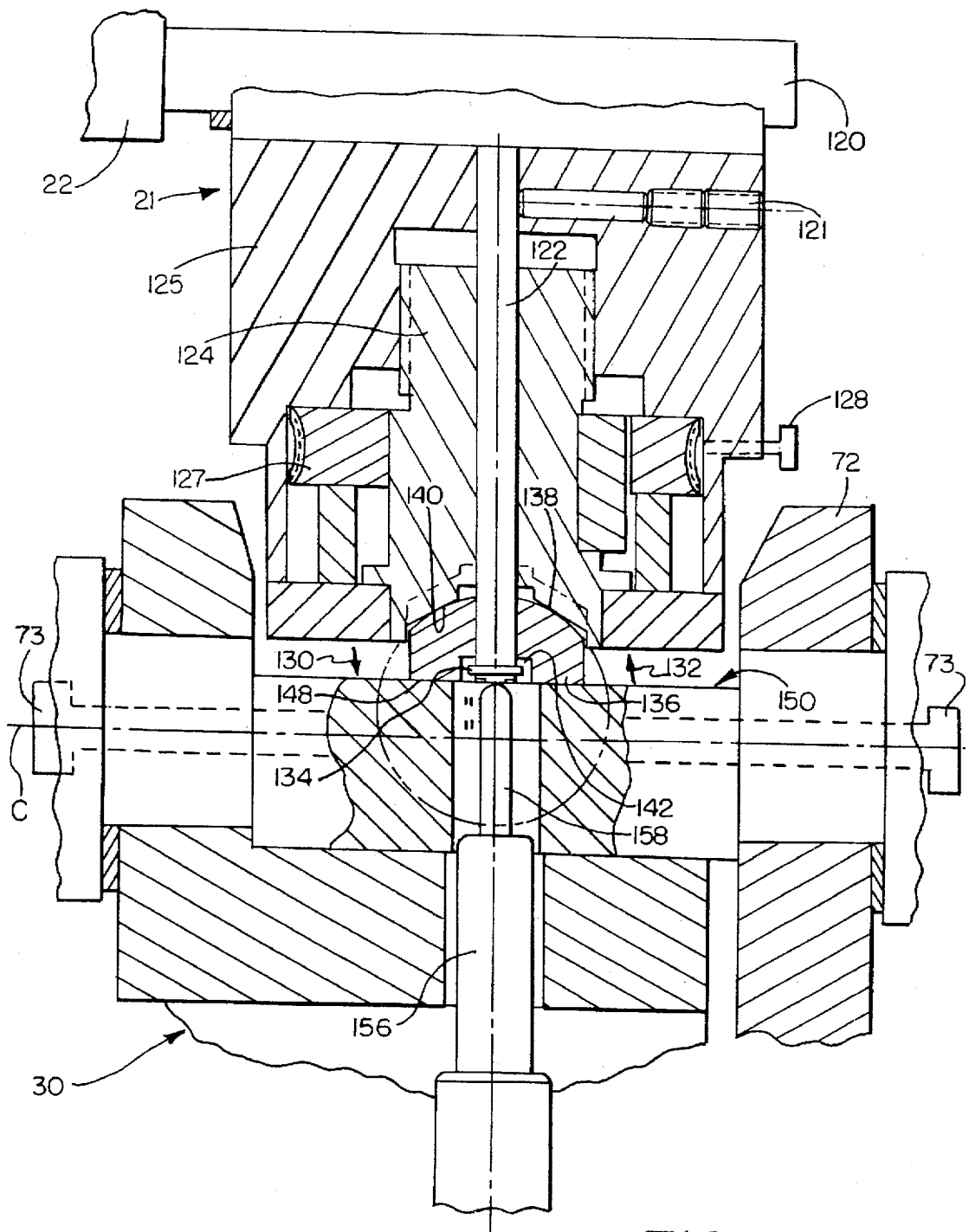
FIG. 4 is a section view of an adjustable bearing and gap adjustment mechanism included in the die coater apparatus in accordance with the present invention.

Referring now to FIG. 4, an exemplary adjustable bearing housing 21 for the backup rolls 20 and 22 is shown. The manner in which the bearing housings 21 are used to finely adjust the gap between the selected backup roll and die will now be explained. As previously mentioned, each side member 72 is connected in pivoting relation to the corresponding main frame side member 30 by way of a pivot pin 73. The backup roll, e.g., backup roll 22, is engaged in journalled relationship with the bearing housing 21 by way of a shaft 120 and precision bearings (not shown) surrounding the shaft 120. The lower portion of the bearing housing 21 extends downward towards the main frame side member 30. A set screw 121 secures a pin (or rod) 122 in the bearing housing. The pin 122 extends through the axial center of a screw 124. The screw 124 is engaged in threaded engagement through a frame portion 125 of the bearing housing 21. Positioned transverse to the screw 124 is a worm gear 127 which engages the threads of screw 124. A handle 128 connected to the worm gear 127 is provided to allow an operator to rotate the worm gear 127 which in turn rotates the screw 124 in a respective direction.

Thus, when the handle 128 is rotated a first direction, the worm gear 127 rotates the screw 124 in a corresponding first direction and moves axially to extend further from the bearing housing 21 in the direction denoted by arrow 130. Alternatively, when the handle 128 is rotated in a second and opposite direction the screw 124 is rotated in a second and opposite direction via the worm gear 127 and moves axially to retreat further into the bearing housing 21 in the direction denoted by arrow 132. The pin 122 remains stationary in relation to the axial movement of the screw 124, and includes a flange 134 for retaining a contact piece (or contact pad) 136 between the distal end of the pin 122 and the bottom of the screw 124. The contact piece 136 has a spherical portion 138 which fits movably within a corresponding concave portion 140 formed in the end of the screw 124. The curvature of the spherical portion 138 cooperates with the concave portion 140 in ball and socket fashion. This allows the bottom 148 of the contact piece to sit flush with on an upper flat portion 150 of the main frame side member 30 even in cases of slight misalignment. The contact piece 136 also includes a cavity portion 142 around the flange 134 to allow for axial movement of the screw 124 relative to the pin 122 at least the amount of distance desired for adjusting the gap G as will be explained.

By rotating the handle 128, the distance which the screw 124 and therefore the bottom 148 of the contact piece 136 extends from the bottom of the housing 21 can be adjusted. The bearing housing 21, as mounted on the corresponding pivot arm, is located such that the bottom 148 of the contact piece will rest upon the upper flat portion 150 of the main frame side member 30 when the hydraulic actuator 60 (FIG. 2) is actuated to close the gap G for a coating operation. As a result, the adjustment of the screw 124 controls the distance of the gap G and therefore allows for fine adjustment of the gap.

Embedded within each main frame side member 30 is a linear variable differential transformer (LVDT) 156 including a push rod 158. The push rod 158 is spring loaded so as to contact the distal end of the pin 122 as shown. The LVDT 156 provides a digital readout to a display (not shown) which indicated the amount the push rod 158 is extended to contact the pin 122, thereby providing an indication of the gap G distance. It will be appreciated that other types of transducers could be used in place of the LVDT in other embodiments without departing from the scope of the invention.

Since the push rod 158 and the transducer 156 are well protected in the frame side member 30 the possibility of damage thereto or inaccuracy of the measurements thereby are minimized. Also, accuracy of gap spacing is enhanced using the ball and socket arrangement of the contact piece 136 spherical portion 138 and concave wall portion 140. Furthermore, accurate alignment between the push rod 158 and the pin 122 helps both to assure accuracy of gap measurement and to minimize possible damage to the push rod and/or transducer.

Referring again to FIG. 1, the die coater 10 includes a control panel 200 having a plurality of control switches A–D. The control panel 200 is used to control the hydraulic actuators discussed herein in a conventional manners. For example, control switch A is a three position switch used to activate the hydraulic actuator 60 in order to open and close the gap G and to raise the roll turret as is discussed above. Control switch B is a two position switch used to activate the hydraulic actuator 45 such that either backup roll 20 or 22 is rotated into position in the application region 13. Control switch C is also a two position switch used to activate the hydraulic actuator 84 such that either die 24 or 26 is rotated into position in the application region 13. Control switch D serves as a system on/off switch.

The die coater 10 further includes a front optical sensor 202 and a rear optical sensor 204. The sensors 202 and 204 serve as safety mechanisms for stopping the die coater 10 in the event an object such as the arm or head of the operator is placed in close proximity to the application region 13. The sensors are connected to a control circuit (not shown) in the control panel 200. In the preferred embodiment, the optical sensors 202 and 204 are infrared sensors each of which produce an infrared beam parallel with the gap G across the front and rear, respectively, of the application region 13. When either of the beams is broken by an object such as the arm or head of the operator, the control circuit in the control panel detects such event and automatically deactivates the hydraulic actuator 60 so as to open the gap G.

Continuing to refer to FIG. 4, each bearing housing 21 includes a pneumatic brake 160 or the like for stopping the backup rolls. In the event of a web stop, the brake 160 is applied to stop the selected backup roll. By stopping the backup roll, web breaks that may otherwise occur during a web stop can be avoided.

Furthermore, the present invention has been described as using hydraulic means for rotating the roll and die turrets and for opening and closing the gap G via the pivot arms 34. It will be appreciated, however, that other means such as electro-mechanical devices or pneumatic means, manual means etc. can be utilized to perform such functions without departing from the scope of the invention. In addition, the exemplary embodiment has been described as including a pair of backup rolls and a pair of dies on the roll turret 16 and die turret 18, respectively. However, different embodiments of the die coater 10 may include a different number of backup rolls and dies without departing from the scope of the invention. The number of backup rolls, moreover, can be different from the number of dies. The respective backup rolls and dies are preferably equally spaced about the corresponding turrets, and the hydraulic actuators or the like are configured so as to position selectively the selected backup roll and die in the application region 13. Moreover, although rigid mechanical stops are utilized in the preferred embodiment, other mechanical positioning means such as a ratchet mechanism can be used as can other forms of positioning means such as purely electrical type positioning means as will be appreciated. As for the pivot adjustment mechanism 108, it will be appreciated that other mechanical or electro-mechanical means can be utilized for adjusting the angle of attack in the application region 13 without departing from the scope of the invention.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A die coater for applying a material to a web, comprising:

a die for applying said material to said web in an application region; and a plurality of interconnected backup rolls, and means for selectably positioning respective backup rolls in said application region to backup said web for said applying of said material, and wherein said means for selectably positioning said interconnected rolls comprises a hub member role, fable about an axis parallel to a face of said die, and each of said interconnected rolls are rotatable about a respective axis which is parallel to said face of said die.

2. A die coater according to claim 1, wherein said interconnected rolls represent different width backup rolls.

3. A die coater according to claim 1, further including means for rotating said hub member about said axis.

4. A die coater according to claim 1, further including a pair of arms between which said hub member is rotatably secured.

5. A die coater according to claim 4, said pair of arms being controllably pivotable about another axis to adjust a gap between a selectably positioned one of said rolls and said die.

6. A die coater according to claim 5, further comprising means for pivoting said arms about said another axis.

7. A die coater according to claim 6, wherein said means for pivoting comprises an hydraulic actuator.

8. A die coater according to claim 6, wherein said means for pivoting tends to urge said gap towards an open position during a power down condition.

9. A die coater according to claim 1, further including at least one idler roll connected to said hub, and wherein an outer surface of each of said interconnected rolls and said at least one idler roll are substantially equidistant from said axis.

10. A die coater according to claim 1, said die being adjustable so as to adjust an angle at which said material is applied to said web.

11. A die coater according to claim 1, further comprising at least one other die interconnected with said die such that said interconnected dies are selectably positionable in said application region to serve as a die for said application of said material.

12. A die coater according to claim 1, further including a sensor for detecting objects approaching said application region and for stopping said die coater in the event an object is detected.

13. A die coater for applying a material to a web comprising;
a die for applying said material to said web in an application region; and
a plurality of interconnected backup rolls, and means for selectably positioning respective backup rolls in said application region to backup said web for said applying of said material, and
wherein said interconnected rolls are selectably positionable without stopping said web as said web is run through said die coater.

14. A die coater for applying a material to a web, comprising:
a hub,
a plurality of interconnected dies mounted in operative connection with the hub and selectably positionable in an application region by first means for moving the hub for applying a material to said web;
a backup roll for said web in said application region; and
further comprising second means for adjusting the angle at which said material is applied to said web through said selected die by adjusting a selected one of said interconnected dies selectably positioned in said application region.

15. A die coater according to claim 14, wherein said interconnected dies are connected to a hub member rotatable about an axis parallel to a face of said backup roll.

16. A die coater according to claim 15, further including means for rotating said hub member about said axis.

17. A die coater according to claim 14, further comprising means for providing said material to be applied to a selected one of said interconnected dies selectably positioned in said application region.

18. A die coater according to claim 14, further comprising a frame member to which said interconnected dies are attached and which is pivotable about an axis to adjust said angle.

19. A die coater according to claim 14, further comprising at least one other backup roll interconnected to said backup roll, said interconnected backup rolls being selectably positionable in said application region to serve as a backup roll for said web for said application of said material.

20. A die coater for applying a material to a web, comprising:
a plurality of interconnected dies selectably positionable in an application region for applying a material to said web;
a backup roll for said web in said application region; and
further comprising means for adjusting a selected one of said interconnected dies selectably positioned in said application region to adjust an angle at which said material is applied to said web through said selected die, and
wherein said interconnected dies are selectably positionable without stopping said web as said web is run through said die coater.

21. A die coater for applying a material to a web, comprising:
a die for applying said material to said web in an application region; and
a plurality of interconnected rolls selectably positionable in said application region to serve as a backup roll for said web for said application of said material, further comprising
apparatus for adjusting spacing between two relatively movable parts, one of which is the selected backup roll and the other of which is the die, comprising
an adjustable member movably mounted with respect to one of said parts to determine the spacing between the two parts,
a contact pad mounted in alignment with said adjustable member for engaging with respect to the other relatively movable part whereby the contact pad separates the parts from each other by an mount determined by the adjustment of the adjustable member, and
said adjustable member and contact pad having a ball and socket type engaging pair of surfaces to provide secure engagement therebetween while said contact pad is engaged securely relative to the other relatively movable part to accommodate misalignments of the parts.

22. Apparatus according to claim 21, said adjustable member comprising a threaded member in threaded engagement with said one part and being adjustable relative to said one part by a turning action of the respective threads thereof.

23. Apparatus according to claim 21, further comprising a rod for mounting said contact pad relative to said one part in alignment for engaging the other part.

24. Apparatus according to claim 23, further comprising a transducer in said other part, said transducer having a member engageable with said rod to detect the spacing of said parts.

25. Apparatus according to claim 21, further comprising means for mounting said contact pad relative to said one part in alignment for engaging the other part.

26. Apparatus according to claim 25, further comprising a transducer in said other part, said transducer having a member engageable with said means for mounting to detect the spacing of said parts.

27. Apparatus according to claim 26, said transducer comprising a linear variable differential transformer.

28. Apparatus according to claim 21, said ball and socket type engaging a pair of surfaces comprising a surface that is at least part of a sphere and a corresponding concave surfaces, respectively.

29. Apparatus according to claim 21, said other part and said contact pad having a pair of generally flat surfaces for mutual engagement.

* * * * *